(12) United States Patent
Yoshida et al.

(10) Patent No.: US 9,874,222 B2
(45) Date of Patent: Jan. 23, 2018

(54) SCROLL STRUCTURE OF TURBINE HOUSING

(71) Applicant: MITSUBISHI HEAVY INDUSTRIES, LTD., Tokyo (JP)

(72) Inventors: Toyotaka Yoshida, Tokyo (JP); Takao Yokoyama, Tokyo (JP); Motoki Ebisu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 822 days.

(21) Appl. No.: 14/350,494

(22) PCT Filed: Oct. 10, 2012

(86) PCT No.: PCT/JP2012/076173
§ 371 (c)(1),
(2) Date: Apr. 8, 2014

(87) PCT Pub. No.: WO2013/105316
PCT Pub. Date: Jul. 18, 2013

(65) Prior Publication Data
US 2014/0294577 A1  Oct. 2, 2014

(30) Foreign Application Priority Data

Jan. 11, 2012 (JP) .................. 2012-002756

(51) Int. Cl.
*F04D 29/40* (2006.01)
*F02B 37/02* (2006.01)
(Continued)

(52) U.S. Cl.
CPC ........... *F04D 29/403* (2013.01); *F01D 9/026* (2013.01); *F02C 6/12* (2013.01); *F02B 37/025* (2013.01); *F05D 2220/40* (2013.01)

(58) Field of Classification Search
CPC .......... F01D 9/026; F02B 37/025; F02C 6/12; F04D 29/403; F05D 2220/40
(Continued)

(56) References Cited

U.S. PATENT DOCUMENTS

2003/0077170 A1   4/2003  Osako et al.
2011/0008162 A1   1/2011  Yokoyama et al.

FOREIGN PATENT DOCUMENTS

CN       100447373 C    12/2008
EP        2123861 A2    11/2009
(Continued)

OTHER PUBLICATIONS

Chinese Office Action and Search Report for Chinese Application No. 201280049585.5, dated Aug. 25, 2015, with an English translation.
(Continued)

*Primary Examiner* — Mark Laurenzi
*Assistant Examiner* — Paul Thiede
(74) *Attorney, Agent, or Firm* — Birch, Stewart, Kolasch & Birch, LLP

(57) ABSTRACT

The flow-through characteristics of twin exhaust gas scroll passages of a turbine are made equal to each other. A tongue which partitions the scroll portions into outer peripheral portions and inner peripheral portions includes a front-side tongue and a rear-side tongue that respectively close the two exhaust gas passages at the outer peripheral portion. The inner sides of the front-side tongue and the rear-side tongue, and the minimal outflow width portions of the front-side passage and the rear-side passage, respectively, are formed substantially parallel to each other at a downstream end of the outer peripheral portion.

9 Claims, 8 Drawing Sheets

(51) Int. Cl.
*F02C 6/12* (2006.01)
*F01D 9/02* (2006.01)

(58) Field of Classification Search
USPC .................................................. 415/205, 184
See application file for complete search history.

(56) References Cited

FOREIGN PATENT DOCUMENTS

| | | |
|---|---|---|
| JP | 63-140 U | 1/1988 |
| JP | 63-141836 U | 9/1988 |
| JP | 1-66433 U | 4/1989 |
| JP | 5-44488 A | 2/1993 |
| JP | 5-272346 A | 10/1993 |
| JP | 2003-120303 A | 4/2003 |
| JP | 2006-348894 A | 12/2006 |
| JP | 2008-101589 A | 5/2008 |
| WO | WO 2010/047259 A1 | 4/2010 |

OTHER PUBLICATIONS

Extended European Search Report for European Application No. 12864916.7, dated Aug. 4, 2015.
International Preliminary Report on Patentability and Written Opinion of the International Searching Authority (Forms PCT/IB/338, PCT/IB/326, PCT/IB/373 and PCT/ISA/237), dated Jul. 24, 2014, for International Application No. PCT/JP2012/076173, including English translation thereof.
International Search Report and Written Opinion of the International Searching Authority (Forms PCT/ISA/210, PCT/ISA/220 and PCT/ISA/237), dated Dec. 25, 2012, for International Application No. PCT/JP2012/076173, including an English translation of the International Search Report.
Decision to Grant issued in the corresponding Japanese Patent Application No. 2012-002756, dated Jun. 3, 2016, including an English Translation thereof.

(a) EMBODIMENT (b) COMPARATIVE EXAMPLE (a) EMBODIMENT (b) COMPARATIVE EXAMPLE (a) EMBODIMENT (b) COMPARATIVE EXAMPLE

CONVENTIONAL ART

CONVENTIONAL ART

SCROLL STRUCTURE OF TURBINE HOUSING

TECHNICAL FIELD

The present invention relates to a scroll structure of a turbine housing, and more particularly, to a scroll structure of a turbine housing of a twin scroll turbocharger that includes a dual exhaust gas passage introducing exhaust gas to a turbine rotor.

BACKGROUND ART

A twin scroll turbocharger, which avoids the exhaust interference caused by a plurality of cylinders of an engine and improves the rotation efficiency of a turbine rotor by effectively using a pulse effect of an exhaust pulse, is known as a turbocharger that is mounted on a vehicle.

FIG. 7 is a schematic view of an engine including such a twin scroll turbocharger. As shown in FIG. 7, an engine 100 including a twin scroll turbocharger 130 includes, for example, four cylinders 10a, 10b, 10c, and 10d and phases of crank angles of these cylinders 10a to 10d are shifted from each other by, for example, 180□. Among these four cylinders, the cylinders 10a and 10d are connected to a first exhaust manifold 16 and the cylinders 10b and 10c are connected to a second exhaust manifold 18. The phases of the crank angles of the cylinders 10a and 10d are shifted from each other by, for example, 360□, so that the respective exhaust pulses of the cylinders 10a and 10d do not interfere with each other. Likewise, the phases of the crank angles of the cylinders 10b and 10c are shifted from each other by, for example, 360□, so that the respective exhaust pulses of the cylinders 10b and 10c do not interfere with each other.

The first exhaust manifold 16 is connected to an exhaust gas passage (front-side passage 122) formed in a turbine housing 132, so that exhaust gas discharged from the cylinders 10a and 10d is introduced to a turbine rotor 140 accommodated in the turbine housing 132 through the front-side passage 122. Likewise, the second exhaust manifold 18 is connected to an exhaust gas passage (rear-side passage 124) formed in the turbine housing 132, so that exhaust gas discharged from the cylinders 10b and 10c is introduced to the turbine rotor 140 accommodated in the turbine housing 132 through the rear-side passage 124. When a rotor blade 142 is rotated by the introduced exhaust gas, the turbine rotor 140 and a turbine shaft 36 supporting the turbine rotor 140 are rotated and a compressor rotor 34 supported by the turbine shaft 136 is rotated. Accordingly, compressed air is supplied to each of the cylinders 10a to 10d through an intake pipe 14 and an intake manifold 12. The exhaust gas, which has rotated the turbine rotor 140, is discharged to the outside of the engine 100 from an exhaust pipe 20.

The twin scroll turbocharger 130 needs to be designed so that the flow-through abilities of the two exhaust gas passages 122 and 124 are equal to each other. That is, if there is a difference between the flow-through abilities of the front-side passage 122 and the rear-side passage 124, a pressure difference between the exhaust gas flowing in the front-side passage 122 and the exhaust gas flowing in the rear-side passage 124 is generated. The pressure difference between the exhaust gases causes an exhaust resistance difference between the exhaust gas discharged from the cylinders 10a and 10d and the exhaust gas discharged from the cylinders 10b and 10c, so that the operating states of the cylinders 10a and 10d are different from those of the cylinders 10b and 10c. Eventually, there is a concern that the intake and exhaust characteristics of the engine 100 may deteriorate. Accordingly, it is necessary to make the flow-through abilities of the front-side passage 122 and the rear-side passage 124 equal to each other in the twin scroll turbocharger 130.

For this reason, in the twin scroll turbocharger in the related art, two exhaust gas passages are formed to be symmetrical with respect to a partition wall perpendicular to a turbine shaft as shown in, for example, FIG. 4 of PTL 1 so that the flow-through abilities of the two exhaust gas passages are equal to each other.

CITATION LIST

Patent Literature

[PTL 1] Japanese Unexamined Patent Application Publication No. 2008-101589

SUMMARY OF INVENTION

Technical Problem

Incidentally, when the size of the twin scroll turbocharger 130 is reduced due to a problem such as mountability on a vehicle, a turbine housing 132 in which a scroll portion 126 is inclined forward may be employed as a whole due to a joint relationship that is generated when the turbine housing 132 and a bearing housing 33 are connected to each other by a coupling member 35 as shown in FIG. 8. In the turbine housing 132 in which the scroll portion 126 is inclined forward as described above and a central axis 128' of a partition wall 128 partitioning the front-side passage 122 and the rear-side passage 124 is inclined forward with respect to a central axis 136' of the turbine shaft 136, a difference between the flow-through abilities of both of the exhaust gas passages is generated, for example, even though the front-side passage 122 and the rear-side passage 124 are formed to be symmetrical with respect to the central axis 128'.

The invention has been made in consideration of the task in the related art, and an object of the invention is to provide a scroll structure of a turbine housing that is formed so that the flow-through abilities of two exhaust gas passages are equal to each other in a turbine housing of a twin scroll turbocharger in which a partition wall partitioning a scroll portion into the two exhaust gas passages is inclined with respect to a central axis of a turbine shaft.

Solution to Problem

The invention has been made to achieve the above-mentioned task and object in the related art.

A scroll structure of a turbine housing of a twin scroll turbocharger of the invention includes a scroll portion that introduces an exhaust gas to a turbine rotor. The scroll portion includes two exhaust gas passages, that is, a front-side passage and a rear-side passage, which are partitioned by a partition wall parallel to a flow direction of the exhaust gas. The partition wall is inclined with respect to a turbine shaft. A tongue, which partitions the scroll portion into an outer peripheral portion and an inner peripheral portion in a longitudinal section parallel to the flow direction of the exhaust gas, is formed at the turbine housing. The tongue includes a front-side tongue and a rear-side tongue that respectively close the two exhaust gas passages at the outer peripheral portion in the cross-section. Respective inner sides of the front-side tongue and the rear-side tongue and respective minimal outflow width portions of the front-side passage and the rear-side passage are formed substantially parallel to each other in the cross-section at a downstream end of the outer peripheral portion.

The invention is an invention relating to a turbine housing of a twin scroll turbocharger in which the partition wall partitioning the scroll portion into two exhaust gas passages, that is, the front-side passage and the rear-side passage, is inclined with respect to the turbine shaft. The tongue, which partitions the scroll portion into the outer peripheral portion and the inner peripheral portion in the longitudinal section parallel to the flow direction of the exhaust gas, is formed at the turbine housing of the invention. The tongue includes the front-side tongue and the rear-side tongue that respectively close the front-side passage and the rear-side passage in the cross-section perpendicular to the flow direction of the exhaust gas. Further, the respective inner sides of the front-side tongue and the rear-side tongue and the respective minimal outflow width portions of the front-side passage and the rear-side passage are formed substantially parallel to each other in the cross-section at the downstream end of the outer peripheral portion of the scroll portion.

Since the respective inner sides of the front-side tongue and the rear-side tongue and the respective minimal outflow width portions of the front-side passage and the rear-side passage are formed substantially parallel to each other in the invention, the flow rate of the exhaust gas flowing out from the front-side passage is substantially equal to the flow rate of the exhaust gas flowing out from the rear-side passage. That is, the inner sides of the tongues are aligned parallel to the minimal outflow width portions in the exhaust gas passages. Accordingly, the flow direction of the exhaust gas flowing along the inner side of the tongue in the outer peripheral portion is changed to a direction perpendicular to the inner side in the inner peripheral portion exceeding the tongue, and the exhaust gas forms a flow perpendicular to the minimal outflow width portion and flows to the rotor blade. In this case, the velocity component of the exhaust gas, which is perpendicular to the minimal outflow width portion, becomes the flow rate of the exhaust gas passing through the minimal outflow width portion (that is, flowing in the exhaust gas passage). Accordingly, it is possible to prevent an eccentric flow near the tongue and to make vortex characteristics uniform by making the respective inner sides of the front-side tongue and the rear-side tongue parallel to the minimal outflow width portions.

Therefore, it is possible to make the flow-through abilities of the two exhaust gas passages equal to each other by making the invention in this way.

In the invention, a fact that the respective inner sides of the front-side tongue and the rear-side tongue and the respective minimal outflow width portions of the front-side passage and the rear-side passage are "substantially" parallel to each other means a case in which angles, which are formed between the inner sides of the front-side tongue and the rear-side tongue and the minimal outflow width portions of the front-side passage and the rear-side passage, are in the range of −10° to +10°. In this case, the angle formed between the inner side of the front-side tongue and the minimal outflow width portion of the front-side passage does not necessarily need to be equal to the angle formed between the inner side of the rear-side tongue and the minimal outflow width portion of the rear-side passage, and the angles may be angles different from each other.

In the invention, if the front-side passage and the rear-side passage are formed to be substantially symmetrical with respect to a central axis of the partition wall in the cross-section at the downstream end of the outer peripheral portion, it is possible to make the flow-through abilities of the two exhaust gas passages more accurately equal to each other.

Further, when a part of the front-side tongue of the invention is to be cut from an outer side, it is preferable that a portion of the front-side tongue, which is formed on the back of the outer side and is close to the inner side, be formed to be thicker by at least the thickness of the part of the outer side to be cut.

The turbine housing is generally manufactured by casting. Accordingly, an extra thick portion is cut from the inner peripheral portion (shroud portion) of the turbine housing near the rotor blade by machining, so that the inner peripheral portion is machined in a desired shape corresponding to the shape of the rotor blade. In the invention including the above-mentioned front-side tongue, a part of the front-side tongue may be cut from the outer side of the front-side tongue in a step of cutting the extra thick portion. The front-side tongue is a portion exposed to a high-temperature exhaust gas. Accordingly, if a thin portion is locally formed at the front-side tongue, there is a concern that cracks caused by thermal stress may be generated at the thin portion. Therefore, in this case, if a portion of the front-side tongue, which is formed on the back of the outer side and is close to the inner side, is formed to be thicker by at least the thickness of a portion of the outer side to be cut, it is possible to avoid the generation of cracks that are caused by local thermal stress.

Further, it is preferable that a portion of the rear-side tongue close to a rear wall surface extend downstream more than a portion of the rear-side tongue close to a partition wall surface at a downstream end of the rear-side tongue of the invention.

Furthermore, it is preferable that a portion of the front-side tongue close to a front wall surface extend downstream more than a portion of the front-side tongue close to the partition wall surface even at a downstream end of the front-side tongue of the invention.

According to this structure, exhaust gases flowing close to the partition wall surfaces early and easily flow to the turbine rotor in both the rear-side passage and the front-side passage. That is, the exhaust gases easily flow so as to concentrate on the center of the rotor blade in the cross-section, so that it is possible to efficiently rotate the turbine rotor.

Advantageous Effects of Invention

According to the invention, in a turbine housing of a twin scroll turbocharger in which a partition wall partitioning a scroll portion into two exhaust gas passages, that is, a front-side passage and a rear-side passage, is inclined with respect to a turbine shaft, respective minimal outflow width portions of the front-side passage and the rear-side passage are formed so as to have substantially the same passage width, and respective inner sides of the front-side tongue and the rear-side tongue and the respective minimal outflow width portions of the front-side passage and the rear-side passage are formed substantially parallel to each other. Accordingly, it is possible to provide a scroll structure of a turbine housing that is formed so that the flow-through abilities of the two exhaust gas passages are equal to each other.

BRIEF DESCRIPTION OF DRAWINGS

FIG. 6(a) is a cross-sectional view, and FIGS. 6(b) to 6(d) are plan views of respective tongues as seen from above.

DESCRIPTION OF EMBODIMENTS

An embodiment of the invention will be described in detail below with reference to the drawings.

However, the scope of the invention is not limited to the following embodiment. As long as not particularly described, the dimensions, materials, shapes, relative arrangement, and the like of components described in the following embodiment are not to limit the scope of the invention to the following embodiment and are merely exemplified.

Figure 7:
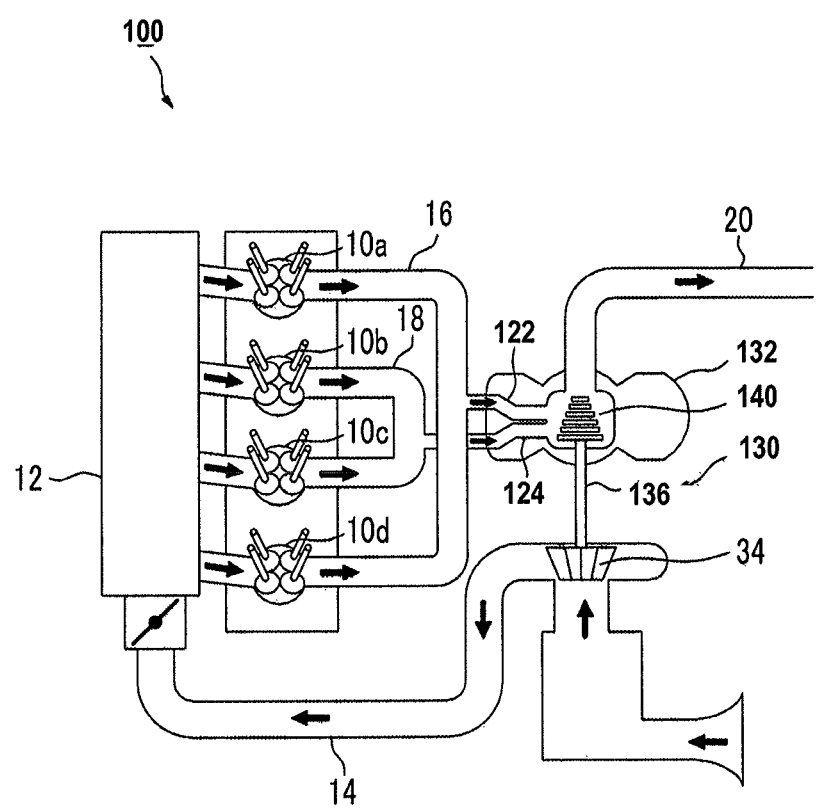
FIG. 7 is a schematic view of an engine including a twin scroll turbocharger.
Figure 8:
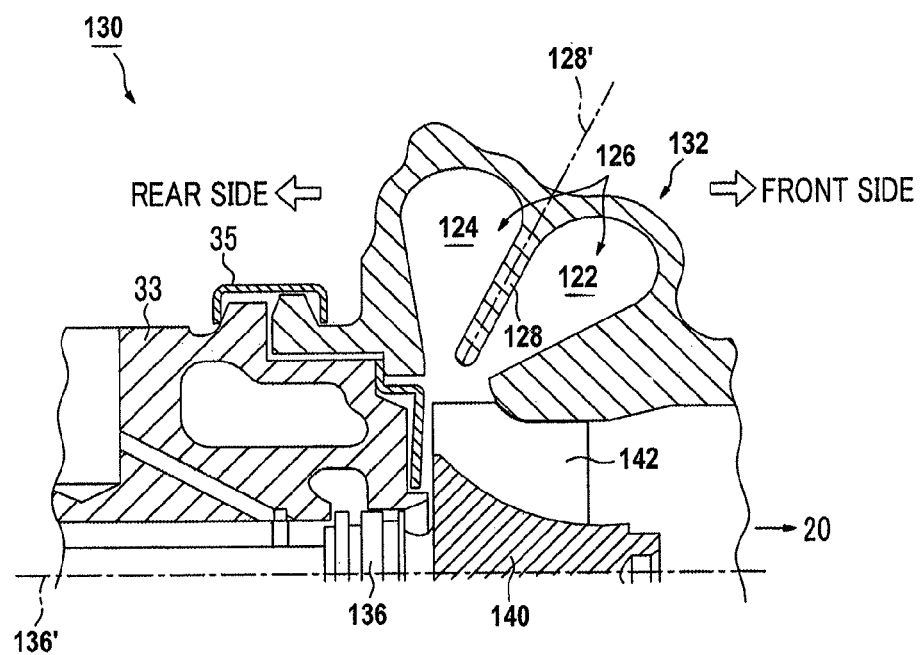
FIG. 8 is a longitudinal sectional view of the twin scroll turbocharger.

As shown in the above-mentioned FIG. 7, a turbine housing 32 of the invention is a turbine housing 32 of a twin scroll turbocharger 30 which accommodates a turbine rotor 40 and at which two exhaust gas passages 22 and 24 introducing exhaust gases to the turbine rotor 40 are formed. As shown in the above-mentioned FIG. 8, a central axis 28' of a partition wall 28 of the turbine housing 32 is inclined with respect to a central axis 36' of a turbine shaft 36 and the turbine housing 32 is connected to a bearing housing 33 by a coupling member 35.

Figure 1:
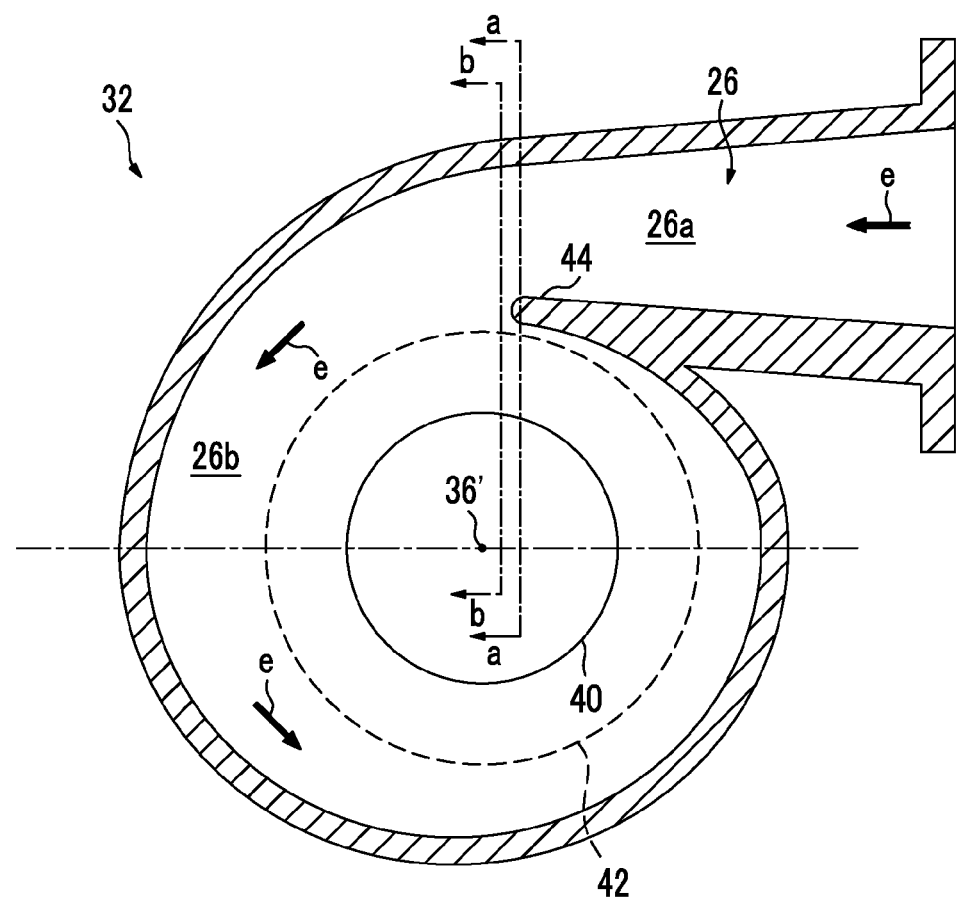
FIG. 1 is a longitudinal sectional view of a turbine housing of a twin scroll turbocharger of the invention.
Figure 2:
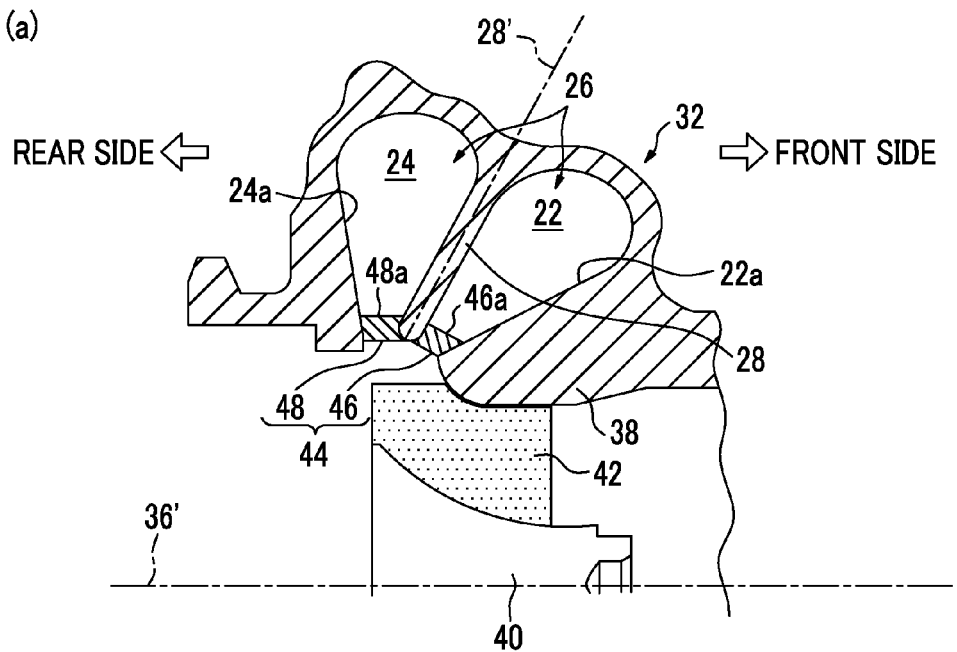
FIG. 2(a) is a cross-sectional view taken along line a-a of FIG. 1.
FIG. 2(b) is a cross-sectional view taken along line b-b of FIG. 1.
Figure 2:
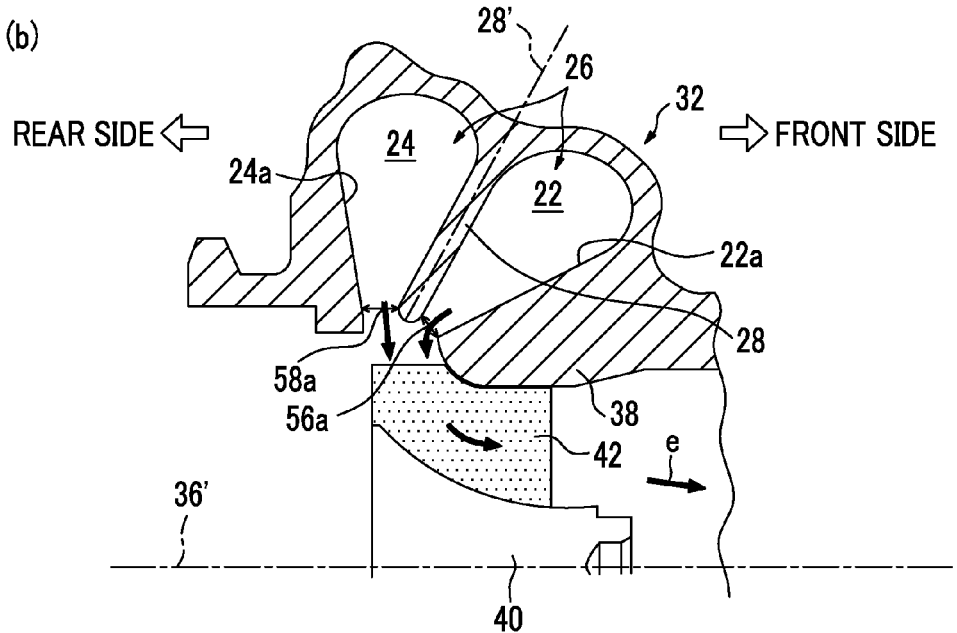

As shown in FIG. 1, in a longitudinal section parallel to the flow direction of an exhaust gas e, a scroll structure of the turbine housing 32 of the invention includes a spiral scroll portion 26 and a tongue that partitions the scroll portion 26 into an outer peripheral portion 26a and an inner peripheral portion 26b. As shown in FIG. 2, in a cross-section perpendicular to the flow direction of the exhaust gas e, the scroll portion 26 is partitioned into a front-side passage 22 and a rear-side passage 24 by the partition wall 28. As shown in FIG. 2(a), the above-mentioned tongue 44 includes a front-side tongue 46 and a rear-side tongue 48 that close the front-side passage 22 and the rear-side passage 24 at the outer peripheral portion 26a in the cross-section, respectively. FIG. 2(a) is a cross-sectional view taken along line a-a of FIG. 1, and FIG. 2(b) is a cross-sectional view taken along line b-b of FIG. 1.

In the invention, respective inner sides 46a and 48b of the front-side tongue 46 and the rear-side tongue 48 are formed substantially parallel to minimal outflow width portions 56a and 58a shown in FIG. 2(b) as described below. Meanwhile, the "minimal outflow width portions" in the invention means portions, of which the passage widths are the minimum, of outflow portions of the front-side passage 22 and the rear-side passage 24 in the cross-sections at the downstream end of the above-mentioned outer peripheral portion 26a (the cross-sections taken along line a-a and b-b of FIG. 1).

In the invention, the front-side passage 22 and the rear-side passage 24 are formed to be substantially symmetrical with respect to the central axis 28' of the partition wall 28 in the cross-section at the downstream end of the outer peripheral portion 26a.

Figure 3:
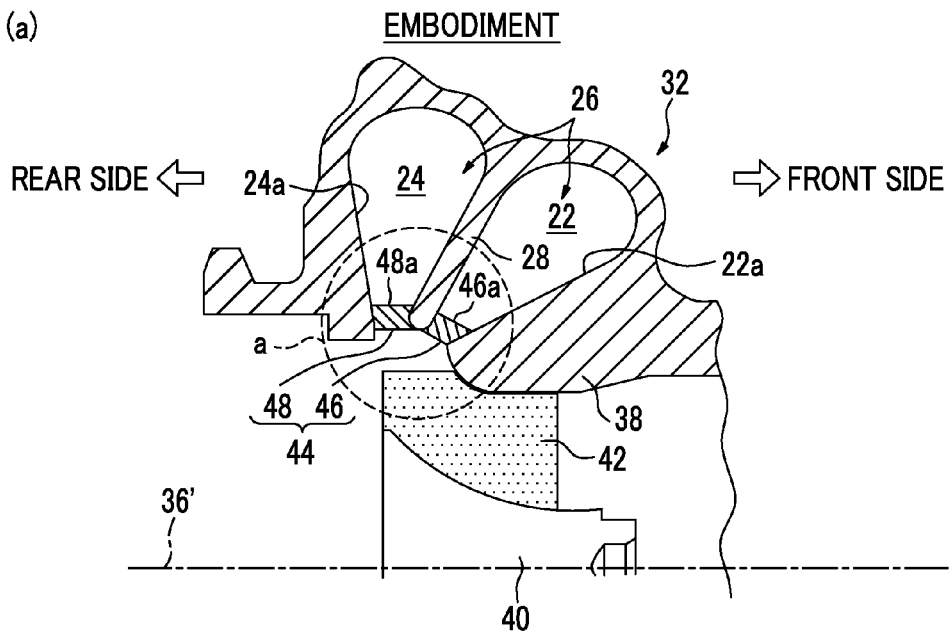
FIG. 3(a) is a cross-sectional view of an embodiment.
FIG. 3(b) is a cross-sectional view of a comparative example.
Figure 3:
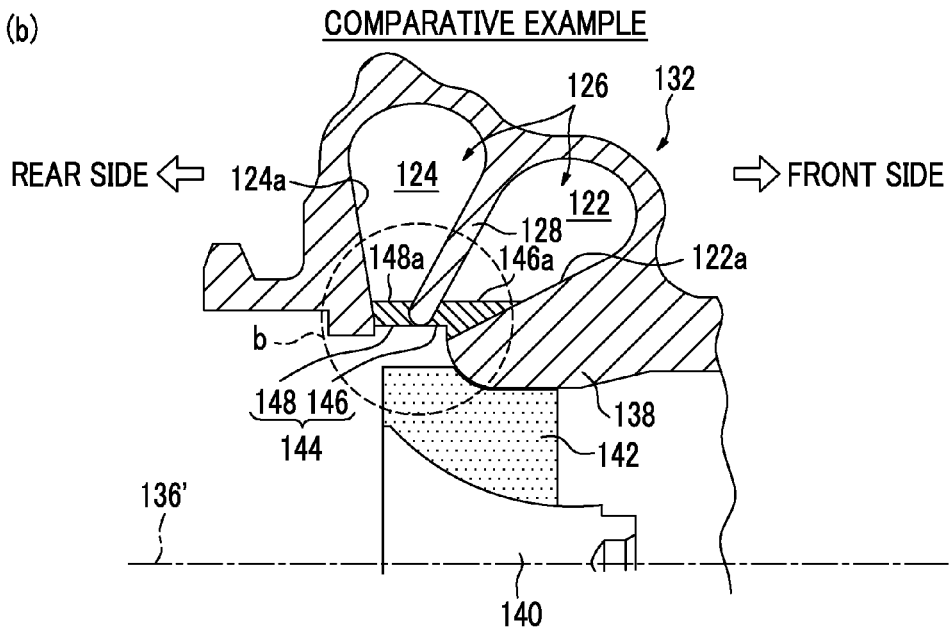
Figure 4:
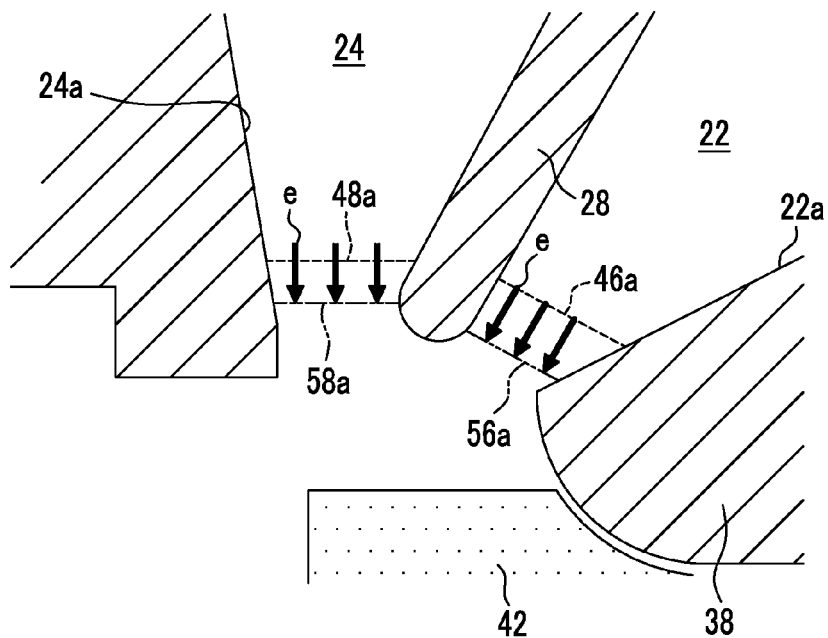
FIG. 4(a) is a cross-sectional view illustrating a relationship between inner sides and minimal outflow width portions of the embodiment.
FIG. 4(b) is a cross-sectional view illustrating a relationship between inner sides and minimal outflow width portions of the comparative example.
Figure 4:
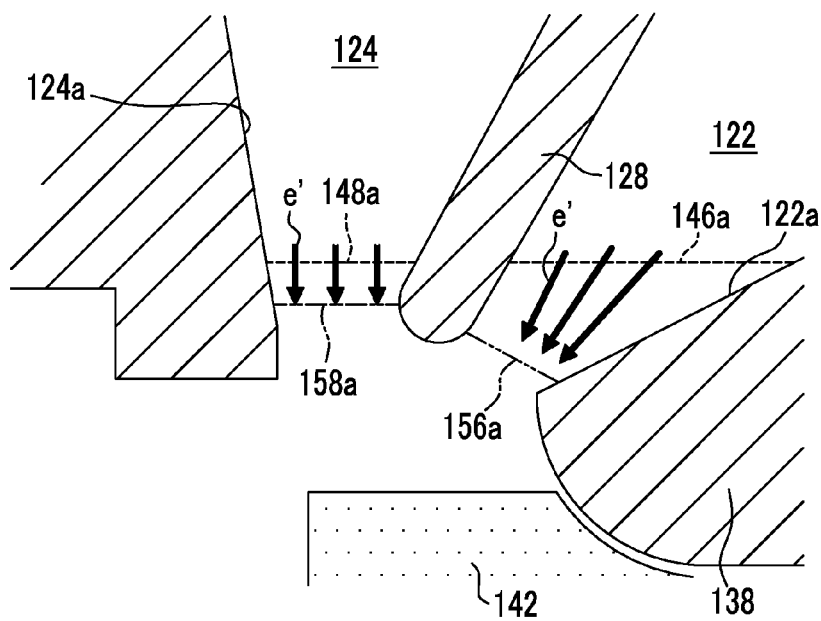

The effect of the scroll structure of the turbine housing 32 of the invention in which the respective inner sides 46a and 48a of the front-side tongue 46 and the rear-side tongue 48 and the respective minimal outflow width portions 56a and 58a of the front-side passage 22 and the rear-side passage 24 are formed substantially parallel to each other in the cross-section at the downstream end of the outer peripheral portion 26a as described above will be described with reference to FIGS. 3 and 4 while the embodiment and a comparative example are compared with each other.

FIG. 3(a) is a cross-sectional view of the embodiment, and FIG. 3(b) is a cross-sectional view of a comparative example. Further, FIG. 4(a) is a cross-sectional view illustrating a relationship between the inner sides and the minimal outflow width portions of the embodiment, and FIG. 4(b) is a cross-sectional view illustrating a relationship between inner sides and minimal outflow width portions of the comparative example. In a turbine housing 132 in the related art that is the comparative example, respective inner sides 146a and 148a of a front-side tongue 146 and a rear-side tongue 148 are horizontally formed so as to be parallel to a central axis 136' of a turbine shaft as shown in FIG. 3(b), unlike in the above-mentioned turbine housing 32 of the invention that is the embodiment.

The flow-through ability of the exhaust gas passage depends on the velocity component of an exhaust gas that is perpendicular to the minimal outflow width portion. Further, in the embodiment, the respective inner sides 46a and 48a of the front-side tongue 46 and the rear-side tongue 48 and the respective minimal outflow width portions 56a and 58a of the front-side passage 22 and the rear-side passage 24 are formed substantially parallel to each other as shown in FIG. 4(a). For this reason, exhaust gases e and e, which pass through the respective minimal outflow width portions 56a and 58a of the front-side passage 22 and the rear-side passage 24, flow in directions perpendicular to the respective minimal outflow width portions 56a and 58a; the flow velocities of both of the exhaust gases are also substantially equal to each other; and the flow rates of the exhaust gases flowing out from the front-side passage 22 and the rear-side passage 24 are also substantially equal to each other.

In contrast, in the comparative example, as shown in FIG. 4(b), the respective inner sides 146a and 148a of the front-side tongue 146 and the rear-side tongue 148 are formed together in a flat shape and the inner side 148a and a minimal outflow width portion 158a are formed substantially parallel to each other, but the inner side 146a and a minimal outflow width portion 156a are not formed substantially parallel to each other. Accordingly, as shown in FIG. 4(b), the flow of an exhaust gas e', which flows out from a front-side passage 122, is biased and the exhaust gas e' flows at a flow velocity different from the flow velocity of an exhaust gas e' that flows out from a rear-side passage 124. Therefore, the flow rates of the exhaust gases, which flow out from the front-side passage 122 and the rear-side passage 124, are different from each other.

As described above, in the scroll structure of the turbine housing 32 of the invention, the respective inner sides 46a and 48a of the front-side tongue 46 and the rear-side tongue 48 and the respective minimal outflow width portions 56a and 58a of the front-side passage 22 and the rear-side passage 24 are formed substantially parallel to each other. Accordingly, a difference between the flow-through abilities of the two exhaust gas passages, which is caused by the inclination of the partition wall 28 with respect to the central axis 36' of the turbine shaft, is corrected, so that it is possible to make the flow-through abilities of the front-side passage 22 and the rear-side passage 24 equal to each other. Further, in this case, if the front-side passage 22 and the rear-side passage 24 are formed to be substantially symmetrical with respect to the central axis 28' of the partition wall 28 in the cross-section at the downstream end of the outer peripheral portion 26a as described above, it is possible to make the flow-through abilities of the front-side passage 22 and the rear-side passage 24 more accurately equal to each other.

Incidentally, the above-mentioned turbine housing 32 of the invention is manufactured by casting. For this reason, as shown in FIG. 5(a), an extra thick portion 38a is formed on an inner peripheral portion (shroud portion 38) of the turbine housing 32 near a rotor blade 42 and is cut by a cutting tool 37 for a lathe, so that the inner peripheral portion is formed in a desired shape corresponding to the shape of the rotor blade 42.

Figure 5:
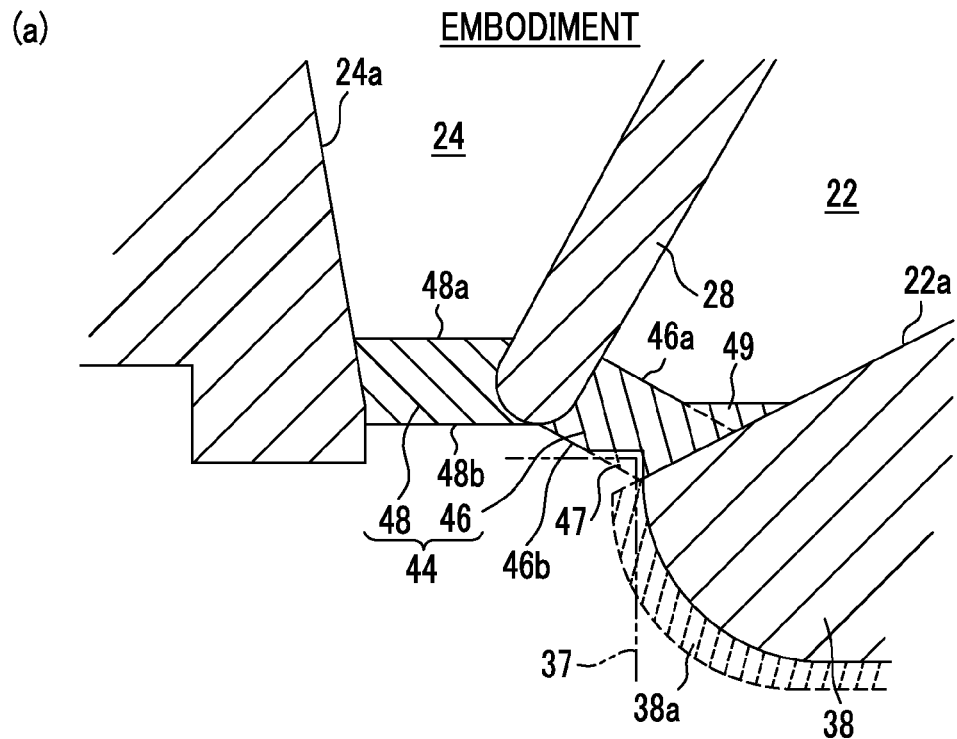
FIG. 5(a) is an enlarged view of an "a" portion of FIG. 3(a) and is a cross-sectional view of the embodiment showing a case in which an extra thick portion of a shroud portion is cut.
FIG. 5(b) is an enlarged view of a "b" portion of FIG. 3(b) and is a cross-sectional view of the comparative example showing a case in which an extra thick portion of a shroud portion is cut.
Figure 5:
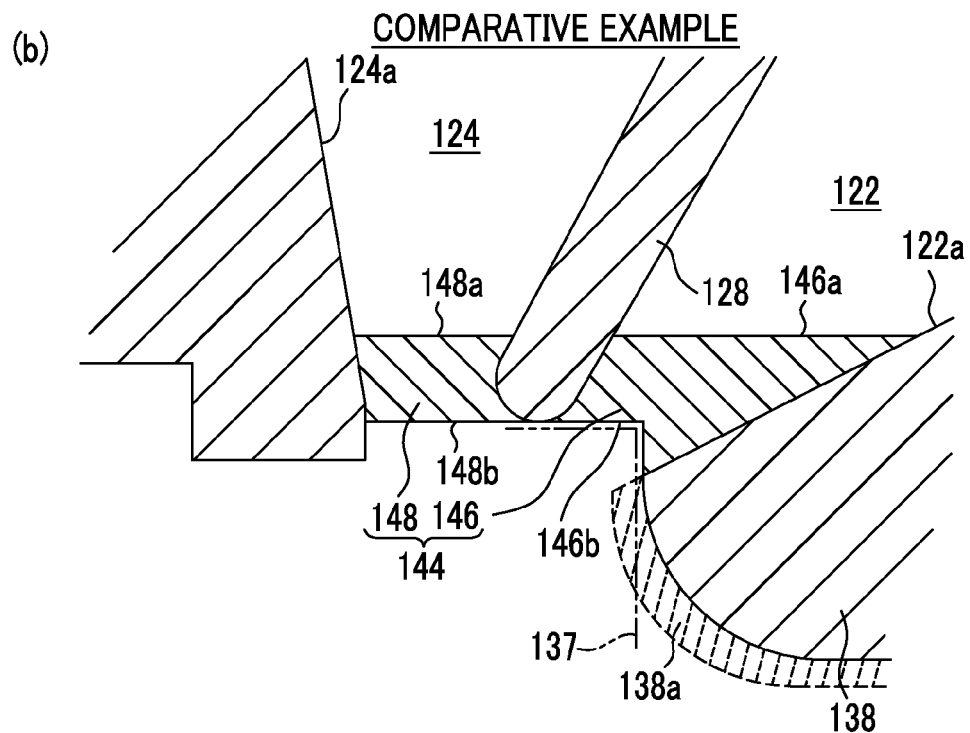

In the above-mentioned comparative example, as shown in FIG. 5(b), the front-side tongue 146 is not cut even when an extra thick portion 138a is cut by a cutting tool 137 for a lathe. Even if a part of an outer side 146b of the front-side tongue 146 is cut, there is no particular problem since the front-side tongue 146 of the comparative example is formed to be sufficiently thick.

In contrast, if a part of an outer side 46b of the front-side tongue 46 is cut as shown in FIG. 5(a) in the embodiment, there is the following problem. That is, the front-side tongue 46 is a portion exposed to a high-temperature exhaust gas. Accordingly, if a part of the outer side 46b of the front-side tongue 46 is cut and a thin portion is locally formed at the front-side tongue 46, there is a concern that cracks caused by thermal stress may be generated at the thin portion. Therefore, in this case, if a build-up portion 49 corresponding to a cut portion 47 is formed on the inner side 46a and a portion of the front-side tongue 46, which is formed on the back of the outer side 46b and is close to the inner side 46a, is formed to be thicker by at least the thickness of a portion of the outer side 46b to be cut, it is possible to avoid the generation of cracks that are caused by local thermal stress.

Figure 6:
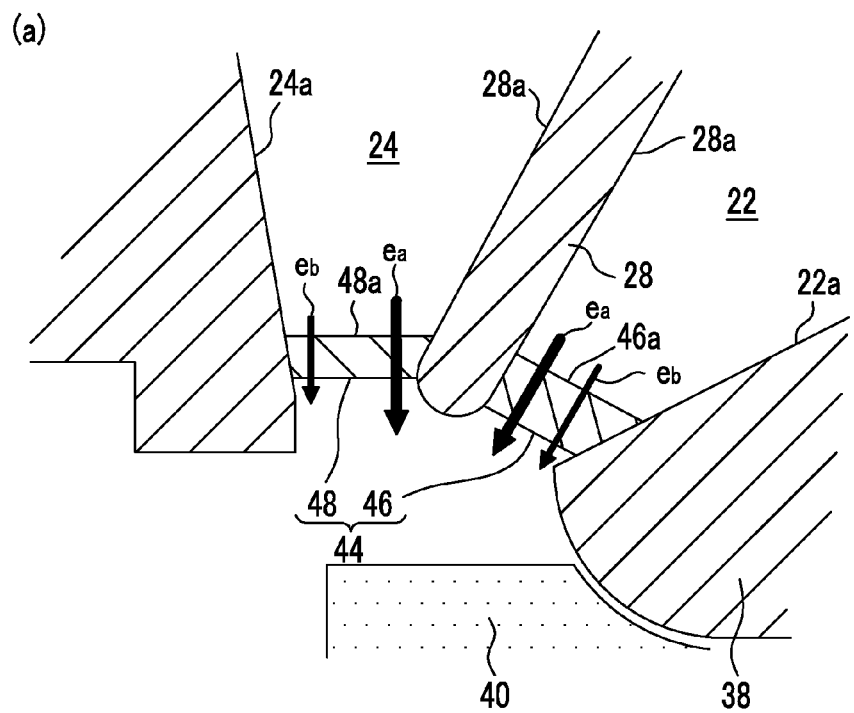
FIG. 6 is a view illustrating the flows of exhaust gases at the respective minimal outflow width portions of a front-side passage and a rear-side passage.
Figure 6:
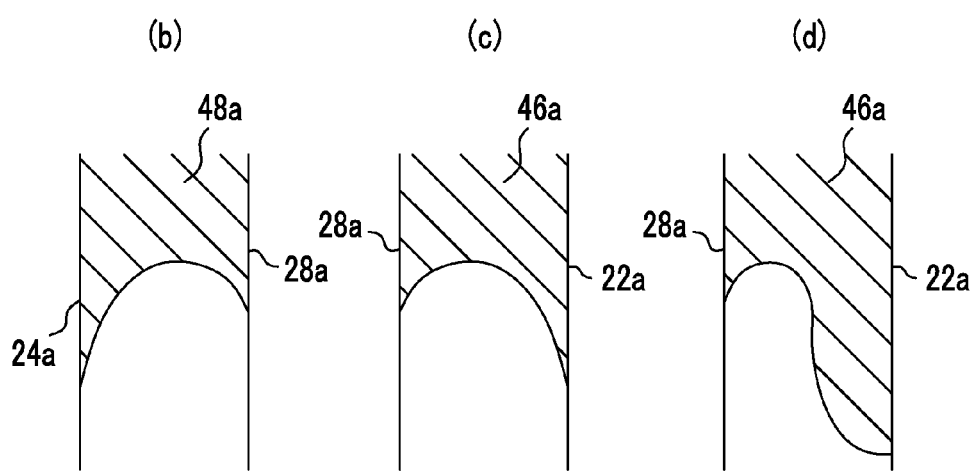

FIG. 6 is a view illustrating the flows of exhaust gases at the respective minimal outflow width portions of the front-side passage 22 and the rear-side passage 24, FIG. 6(a) is a cross-sectional view, and FIGS. 6(b) to 6(d) are plan views of the respective tongues as seen from above. As shown in FIG. 6(b), a portion of the rear-side tongue 48 close to a rear wall surface 24a extends downstream more than a portion of the rear-side tongue 48 close to a partition wall surface 28a, at the downstream end of the rear-side tongue 48. Likewise, as shown in FIG. 6(c), a portion of the front-side tongue 46 close to a front wall surface 22a extends downstream more than a portion of the front-side tongue 46 close to a partition wall surface 28a even at the downstream end of the front-side tongue 46.

A radial component of a flow velocity vector of each of the exhaust gases, which flow near the partition wall surfaces 28a, the rear wall surface 24a, and the front wall surface 22a, is predominant with respect to a circumferential component thereof due to the resistance of the wall surfaces. That is, the exhaust gases, which flow near the partition wall surfaces 28a, the rear wall surface 24a, and the front wall surface 22a, early and easily flow to the turbine rotor 40 as compared to the exhaust gases that flow near intermediate positions between the partition wall surface 28a and the rear wall surface 24a and between the partition wall surface 28a and the front wall surface 22a.

Accordingly, if the rear-side tongue 48 and the front-side tongue 46 are formed as shown in FIGS. 6(b) and 6(c), exhaust gases $e_a$ flowing close to the partition wall surfaces 28a more early and easily flow to the turbine rotor 40 than exhaust gases $e_b$ flowing close to the rear wall surface 24a and the front wall surface 22a in both the rear-side passage 24 and the front-side passage 22. Accordingly, the exhaust gases flow so as to concentrate on the center of the rotor blade 42 in the cross-section, so that it is possible to efficiently rotate the turbine rotor 40. Further, if the width of the front-side tongue 46 extending downward is increased and the length of the front-side tongue 46 is also increased as shown in FIG. 6(d) instead of FIG. 6(c), it is possible to further increase the flow rate of the exhaust gases $e_a$ in the front-side passage 22. That is, it is possible to adjust a flow rate ratio between the above-mentioned exhaust gases $e_a$ and $e_b$ to a desired ratio by adjusting the width and length of the front-side tongue 46 or the rear-side tongue 48 that extends downward.

A preferred embodiment of the invention has been described above. However, the invention is not limited to the above-mentioned embodiment, and may have various modifications without departing from the purpose of the invention.

Industrial Applicability

According to the invention, the invention can be suitably used as a scroll structure of a turbine housing of a twin scroll turbocharger that includes a dual exhaust gas passage introducing exhaust gases to a turbine rotor.

The invention claimed is:

1. A scroll structure of a turbine housing of a twin scroll turbocharger comprising:
a scroll portion that introduces an exhaust gas to a turbine rotor,
wherein the scroll portion includes two exhaust gas passages including a front-side scroll passage and a rear-side scroll passage, which are partitioned by a partition wall parallel to a flow direction of the exhaust gas in the scroll passages,
the partition wall is inclined with respect to a plane perpendicular to a turbine shaft,
a tongue, which partitions the scroll portion into an outer peripheral portion and an inner peripheral portion in a direction perpendicular to the flow direction of the exhaust gas,
the tongue including a front-side tongue and a rear-side tongue associated with said front-side and rear-side scroll passages, respectively, at the outer peripheral portion, wherein the inner side of the front-side tongue is formed substantially parallel to a minimal outflow width portion of the front-side scroll passage and the inner side of the rear-side tongue is formed substantially parallel to a minimal outflow width portion of the rear-side scroll passage at a downstream end of the outer peripheral portion of the scroll portion, and wherein a part of an outer side of the front-side tongue is cut away to form a cut portion of the front-side tongue, and wherein a build-up portion is formed on the inner side of the front-side tongue at a position corresponding to the cut portion on the outer side thereof said build-up portion increasing the thickness of the front-side tongue by at least the thickness of the part of the outer side which is cut away.

2. The scroll structure of the turbine housing according to claim 1, wherein an angle formed between the inner sides of the front-side tongue and the rear-side tongue and the minimal outflow width portions of the front-side passage and the rear-side passage, respectively, as viewed in cross-section from the downstream end of the outer peripheral portion is in the range of −10° to +10°.

3. The scroll structure of the turbine housing according to claim 2, wherein the front-side passage and the rear-side passage are formed to be substantially symmetrical with respect to the partition wall as viewed in cross-section from the downstream end of the outer peripheral portion.

4. The scroll structure of the turbine housing according to claim 3, wherein a portion of the rear-side tongue closest to a rear wall surface of said rear-side passage extends downstream further than a portion of the rear-side tongue closest to a partition wall surface of said rear-side passage.

5. The scroll structure of the turbine housing according to claim 2, wherein a portion of the rear-side tongue closest to a rear wall surface of said rear-side passage extends downstream further than a portion of the rear-side tongue closest to a partition wall surface of said rear-side passage.

6. The scroll structure of the turbine housing according to claim 1, wherein the front-side passage and the rear-side passage are formed to be substantially symmetrical with respect to the partition wall.

7. The scroll structure of the turbine housing according to claim 6, wherein a portion of the rear-side tongue closest to a rear wall surface of said rear-side passage extends downstream further than a portion of the rear-side tongue closest to a partition wall surface of said rear-side passage.

8. The scroll structure of the turbine housing according to claim 1, wherein a portion of the rear-side tongue closest to a rear wall surface of said rear-side passage extends downstream in the direction of gas flow further than a portion of said rear-side tongue closest to a partition wall surface of said rear-side passage.

9. The scroll structure of the turbine housing according to claim 1, wherein a portion of the front-side tongue closest to a front wall surface of said front-side passage extends downstream in the direction of gas flow further than a portion of the front-side tongue closest to the partition wall surface of said front-side passage.

* * * * *